(12) United States Patent
Basir et al.

(10) Patent No.: US 6,678,600 B2
(45) Date of Patent: Jan. 13, 2004

(54) CHILD SEAT DETECTION SYSTEM

(75) Inventors: Otman A. Basir, Kitchener (CA); Fakhreddine Karray, Waterloo (CA); Wail Gueaieb, Waterloo (CA); Brian Johnson, Waterloo (CA)

(73) Assignee: Intelligent Mechatronic Systems Inc., Ontario (CA)

( * ) Notice: Subject to any disclaimer, the term of this patent is extended or adjusted under 35 U.S.C. 154(b) by 0 days.

(21) Appl. No.: 10/310,119

(22) Filed: Dec. 4, 2002

(65) Prior Publication Data

US 2003/0105570 A1 Jun. 5, 2003

Related U.S. Application Data

(60) Provisional application No. 60/336,578, filed on Dec. 4, 2001.

(51) Int. Cl.[7] ............................................... B60R 21/32
(52) U.S. Cl. .......................................... 701/45; 280/735
(58) Field of Search ............................... 280/734, 735; 180/272; 342/70, 72; 701/45, 49

(56) References Cited

U.S. PATENT DOCUMENTS

| 5,439,249 A | | 8/1995 | Steffens, Jr. et al. | |
|---|---|---|---|---|
| 5,446,661 A | * | 8/1995 | Gioutsos et al. | 280/735 |
| 5,454,591 A | | 10/1995 | Mazur et al. | |
| 5,785,347 A | | 7/1998 | Adolph et al. | |
| 6,053,529 A | | 4/2000 | Frusti et al. | |
| 6,243,634 B1 | | 6/2001 | Oestreicher et al. | |
| 6,252,240 B1 | | 6/2001 | Gillis et al. | |
| 6,260,879 B1 | | 7/2001 | Stanley | |
| 6,272,411 B1 | | 8/2001 | Corrado et al. | |

FOREIGN PATENT DOCUMENTS

| WO | 9422603 | * 10/1994 | ................. 280/735 |
|---|---|---|---|

* cited by examiner

Primary Examiner—Richard M. Camby
(74) Attorney, Agent, or Firm—Carlson, Gaskey & Olds

(57) ABSTRACT

A child seat detection system determines the presence of an infant seat and can distinguish between a forward-facing infant seat and a rearward-facing infant seat. The system determines the weight on a vehicle seat and compares the weight on the vehicle seat to a rear-facing infant seat maximum. If the weight on the vehicle seat exceeds the rear-facing infant seat maximum, the system determines whether a forward-facing infant seat is on the seat. If the weight on the vehicle seat does not exceed the rear-facing infant seat maximum, then the system determines whether a rear-facing infant seat is on the seat.

17 Claims, 5 Drawing Sheets

CHILD SEAT DETECTION SYSTEM

This application claims priority to U.S. Provisional Application Ser. No. 60/336,578, filed Dec. 4, 2001.

BACKGROUND OF THE INVENTION

The current invention relates to an occupant safety system for children and babies. It is presumed here that the child is sitting on an appropriate child seat in the front passenger seat. In this description of the invention "child seat" is also named "infant seat" or "baby seat," these are meant to be the same child safety seat.

There has been recently a large amount of active research in the automotive industry to design occupant safety systems for children and babies occupying a child seat in the front passenger seat. Both rear-facing and front child safety seats have yielded fatal risk to infants when crashes occur and airbags have deployed.

Small sports cars with only two seats or standard cab pickup trucks constrain the positioning of the child in front of an airbag. Human errors have occurred frequently while disabling the air bag or forgetting to disable it to accommodate an infant seating in the front. Permanently disabling air bags will certainly discard its benefits for adult passengers that may occupy the front seat.

It is almost a universal standard that babies aged up to one-year-old (weighing under 20 lbs) use a rear-facing seat. A little more than one-year-old kids that weigh at least 20 lbs use a forward-facing child seat. Most forward facing child seats can accommodate children up to 40 lbs or 40 inches in length. Booster seats can accommodate children up to 80 lbs. Adult lap and shoulder belt systems work for children taller than 4'9" and over 80 lbs.

Approximately one quarter of all parents improperly secure children ages 1 to 3 in the passenger seat. Though most of Americans are aware of the risk that air bags pose to infants, 11% continue to place the babies in the passenger seat. In 1996 it was reported that 97 children had died from air bag related injuries in a crash, 18 of those were in child safety seats.

For these reasons, it is very important that a system is designed that will automatically determine whether or not a child seat (occupied or not) is present in the front seat of the car, and if it is the case, the airbag is then automatically disabled.

SUMMARY OF THE INVENTION

The present invention provides a child seat detection system that determines the presence of an infant seat and can distinguish between a forward-facing infant seat and a rearward-facing infant seat. The system determines the weight on a vehicle seat and compares the weight on the vehicle seat to a rear-facing infant seat maximum. If the weight on the vehicle seat exceeds the rear-facing infant seat maximum, the system determines whether a forward-facing infant seat is on the seat. If the weight on the vehicle seat does not exceed the rear-facing infant seat maximum, then the system determines whether a rear-facing infant seat is on the seat. The system can be used in the front passenger seat area and can be used at other seating locations of the car where the knowledge of the presence of a child seat might be of benefit or might increase the safety of the infant.

The system detects child seats but more specifically can distinguish rear-facing infant seats from forward-facing infant seats. The system has the ability of detecting the following: whether or not there is a child seat, whether or not a seat is empty, whether or not a child is sitting alone, whether the person sitting is a small or a large adult.

The child seat detection system relies on multiple technologies for accuracy and reliability. Input signals provided by the sensors included: the front seat weight distribution, the rear seat weight distribution, the occupant proximity to the dashboard or to the head board, the lower back location, and a seat belt usage indicator. This device is not meant to encourage parents to place their child seats in any risk region, but it is rather a preventive type of device.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
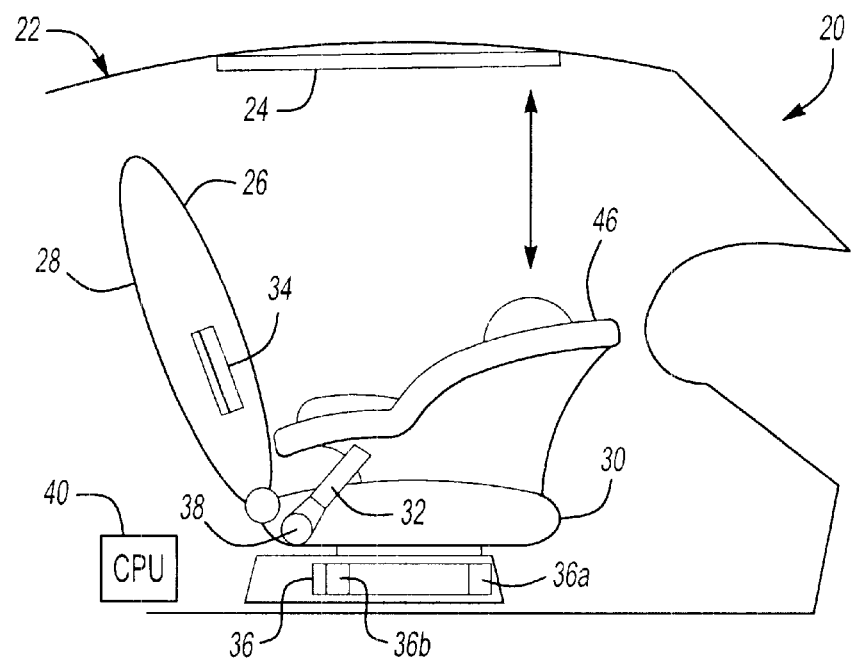
FIG. 1 illustrates the system of the present invention in use with a belted rearfacing infant seat.

The child seat detection system 20 is shown in FIG. 1 installed in a vehicle 22. The child seat detection system 20 includes a proximity sensor 24 preferably mounted on the headliner on the vehicle 22. The proximity sensor 24 is preferably an array of capacitive sensors, such as is disclosed in co-pending application U.S. Ser. No. 10/161,021, Entitled "Three Dimensional Occupant Position Sensor" and filed on Jun. 3, 2002, which is assigned to the same assignee as the current invention and which is hereby incorporated by reference. Generally, the proximity sensor 24 determines the proximity of the occupant to the dashboard and/or airbag. The proximity sensor 24 also determines the distance between the proximity sensor 24 and the occupant, and correspondingly, in general, the height of the occupant, which can also be considered the distance of the occupant from the surface of the vehicle seat 26. The vehicle seat 26 includes a seat back 28 and seat base 30, as well as a seat belt 32.

The system 20 further includes a seat mounted proximity sensor 34 which is generally a capacitive sensor similar to the proximity sensor 24. Generally, the seat mounted proximity sensor 34 determines whether an occupant is seated against the seat back 28.

The system 20 further includes a weight sensor 36 for measuring the weight of the occupant on the seat 26. The weight sensor 36 preferably includes at least a front weight sensor 36A for measuring weight on the front of the base 30 of seat 26 and a rear sensor 36B for measuring weight on a rear portion of the base 30 of the seat 26. The system further includes a seat belt sensor 38 which indicates when the seat belt 32 is in use. All of the sensors described are connected to a CPU 40 (connections not shown for clarity). The CPU 40 includes a processor, memory, and storage and is appropriately programmed to perform the functions described herein.

Figure 7:
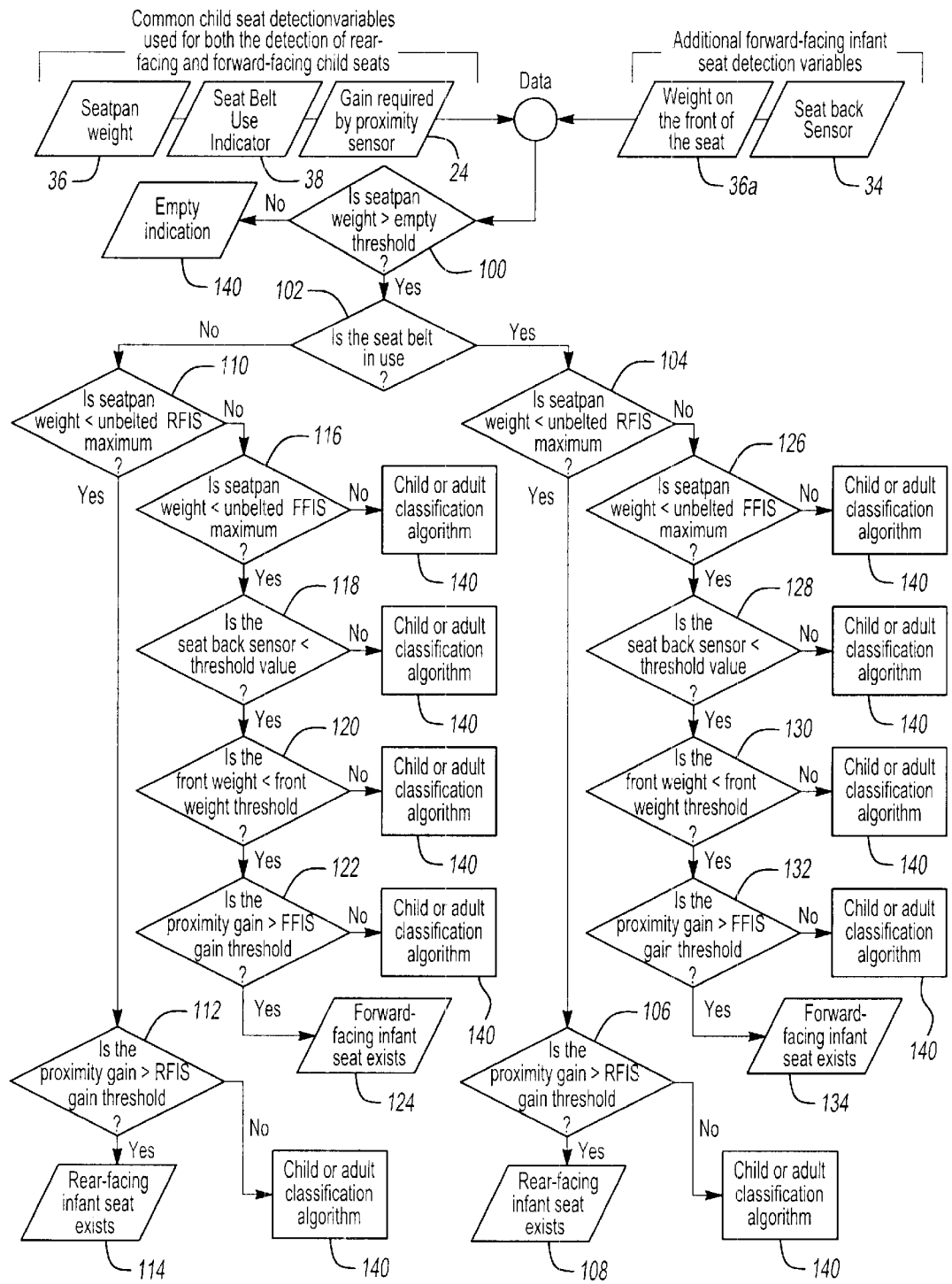
FIG. 7 is a flowchart of the child seat detection algorithm.

In FIG. 1, the system 20 detects the presence of a rear facing child seat 46 in a manner that will be described with reference to the flowchart in FIG. 7. In step 100, the CPU 40 determines whether the seat 26 is empty by comparing information from weight sensor 36 to an empty threshold. If the seat 26 is not empty, the CPU 40 then determines that the seat belt is in use in step 102 based upon the seat belt sensor 38. The CPU 40 then determines whether the weight on the seat 26 as determined by the weight sensor 36 is below a belted rearward-facing infant seat ("RFIS") maximum in step 104. The RFIS maximum can be set to 45 pounds in the belted situation (the weight of an infant required to sit in a rear facing child seat, plus the weight of an average car seat, plus 10 pounds of weight pressing down on the sensor 36 due to the cinching of the seat belt). In FIG. 1, since the infant, car seat and weight from the seat belt 32 are less than 45 pounds, the CPU proceeds to step 106. In step 106, the CPU 40 determines whatever the proximity gain from proximity sensor 24 is greater than an RFIS gain threshold. This is to further confirm that there is a rear facing infant seat in the seat 26. If the proximity gain is greater than the RFIS gain threshold, it is determined that a rear facing infant seat 46 is present in the seat 26 in step 108.

Figure 2:
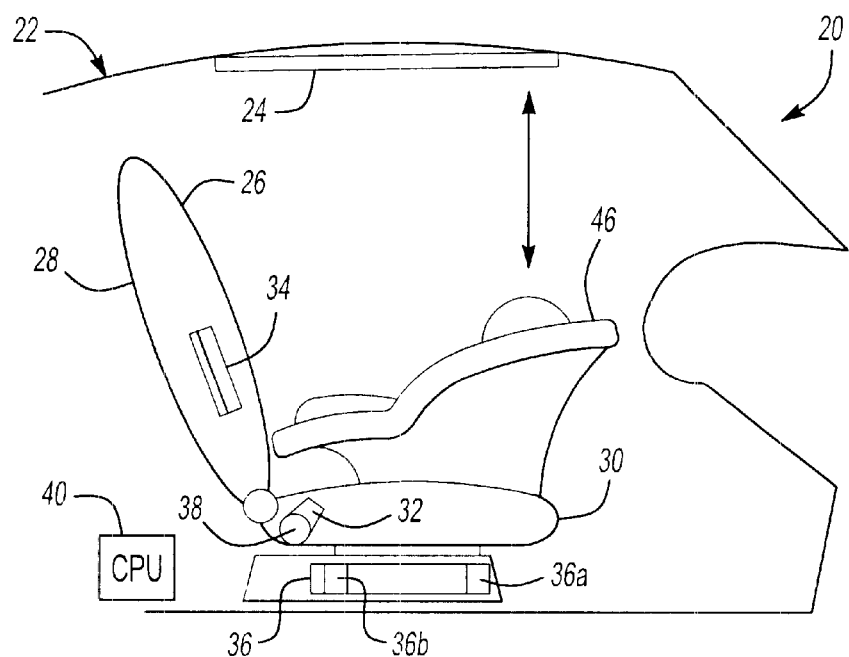
FIG. 2 illustrates the system of the present invention in use with an unbelted rear-facing infant seat.

FIG. 2 illustrates the child seat detection system 20 of the present invention in the vehicle 22 with the rear facing infant seat 46 as in FIG. 1, but with the infant seat 46 unbelted. In this case, again referring to FIG. 7, the CPU proceeds from step 102 to step 110, where the CPU 40 compares the weight from sensor 36 to an unbelted RFIS maximum (for example 35 pounds). In this case, since the weight sensed by weight sensor 36 would not exceed the unbelted RFIS maximum, the CPU proceeds to step 112 which determines whether the proximity gain is greater than the RFIS gain threshold and determines that a rear facing infant seat is present in step 114.

Figure 3:
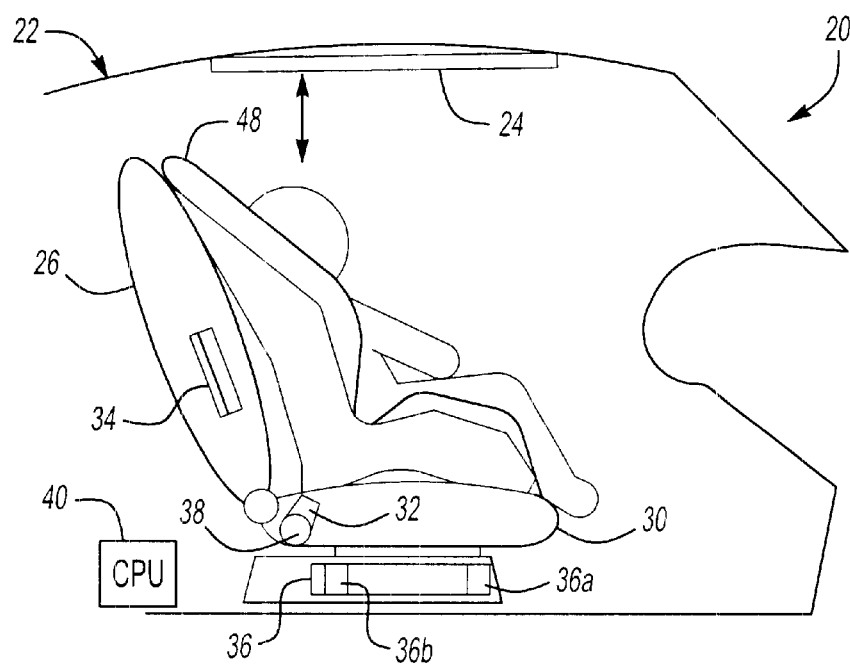
FIG. 3 illustrates the system of the present invention in use with an unbelted forward-facing infant seat.

FIG. 3 illustrates the child seat detection system 20 of the present invention in the vehicle 22 with an unbelted forward-facing child seat 48. In this case, the CPU 40 at step 110 would determine that the seat weight is greater than the unbelted RFIS maximum and from there proceed to step 116. In step 116, the CPU 40 determines whether the seat weight is below an unbelted forward facing infant seat ("FFIS") maximum which may be approximately the weight of the average forward facing infant seat 46 plus the maximum child weight for a forward facing infant seat. Since the seat weight is below the unbelted FFIS maximum the CPU proceeds to step 118, where the CPU 40 determines whether the seat back sensor 34 is below a threshold value. Since the infant seat 46 spaces the infant a few inches away from the seat back 28, this value is below the threshold value and the CPU 40 proceeds to step 120.

In step 120, the CPU 40 determines whether the front weight, as determined by the front weight sensor 36A is below a front weight threshold in order to ensure that there is a forward facing infant seat in the seat 26, not a child or a small adult, who would place more weight on the front of the seat 26. Because the forward facing infant seat 46 does not put sufficient weight on the front of the seat base 30 and front sensor 36A, the CPU 40 proceeds to step 122. In step 122, the CPU 40 determines whether the proximity gain from proximity sensor 24 is above an FFIS gain threshold and determines that a forward facing infant seat, unbelted exists in step 124.

Figure 4:
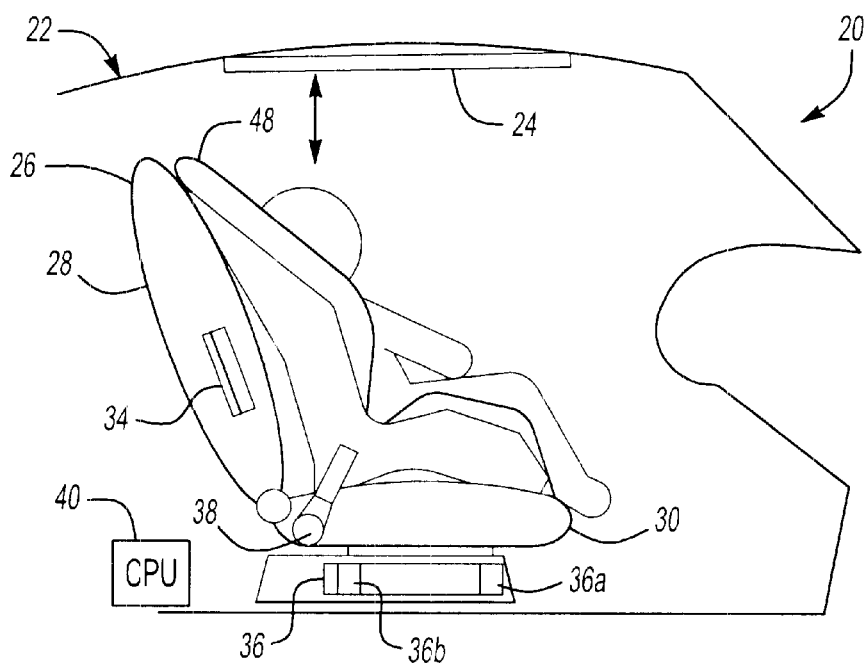
FIG. 4 illustrates the system of the present invention in use with a belted forward-facing infant seat.

FIG. 4 illustrates a forward facing infant seat 48 which is belted into seat 26 in the vehicle 22. The operation of the child seat detection 20 is again described with respect to FIG. 7. The system 20 determines that the seat belt is in use in step 102 and proceeds to step 104, where the CPU 40 determines that the seat weight is greater than the belted RFIS maximum and thus proceeds to step 126. In step 126, the CPU 40 determines that the seat weight is less than the belted FFIS maximum (approximately 100 pounds) and proceeds to step 128. In step 128, the CPU 40 determines that the seat back proximity sensor 34 is generating a signal less than a threshold value, since the infant seat 48 spaces the child away from the sensor 34, and the CPU 40 thus proceeds to step 130. In step 130, the CPU 40 determines that the front weight as determined by front weight sensor 36A is less than the front weight threshold and thus proceeds to step 132. In step 132, the CPU 40 determines whether the proximity gained from the proximity 24 is greater than the FFIS gain threshold, thus indicating that a forward facing infant seat exists in step 134.

Note that in many cases, the system 20 will determine an infant seat is not present and proceed to step 140, where the system 20 will proceed to classify the occupant as a child or an adult and/or respond appropriately. The details of step 140 are not part of this invention. Preferably the determination of the presence of an infant seat 46, 48 is retained upon the event of a crash. This prevents the infant seat front increases in weights and inaccurate data from the sensors that can occur during that time of an accident.

Figure 5:
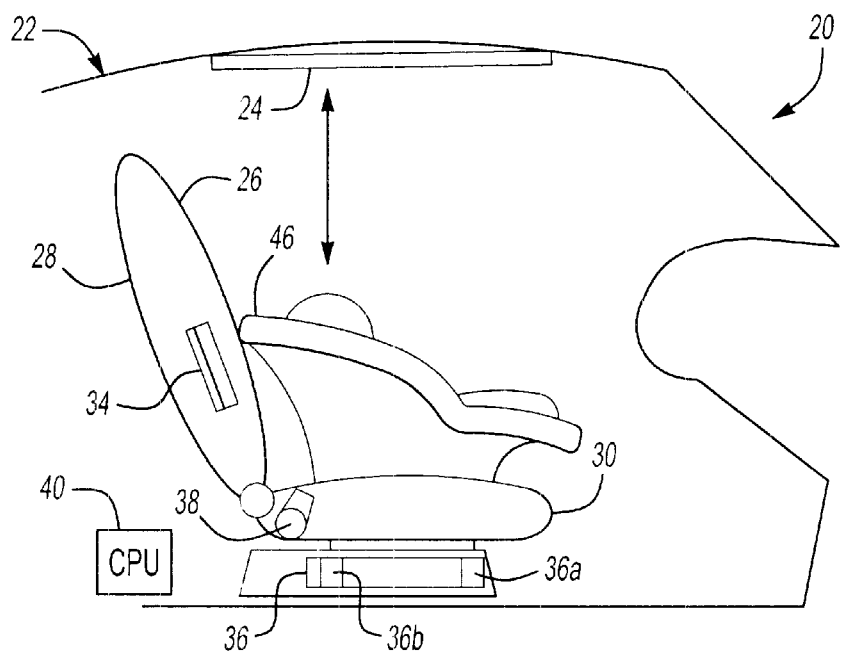
FIG. 5 illustrates the system of the present invention in use with a unbelted rearfacing infant seat but rotated 180 degrees
Figure 6:
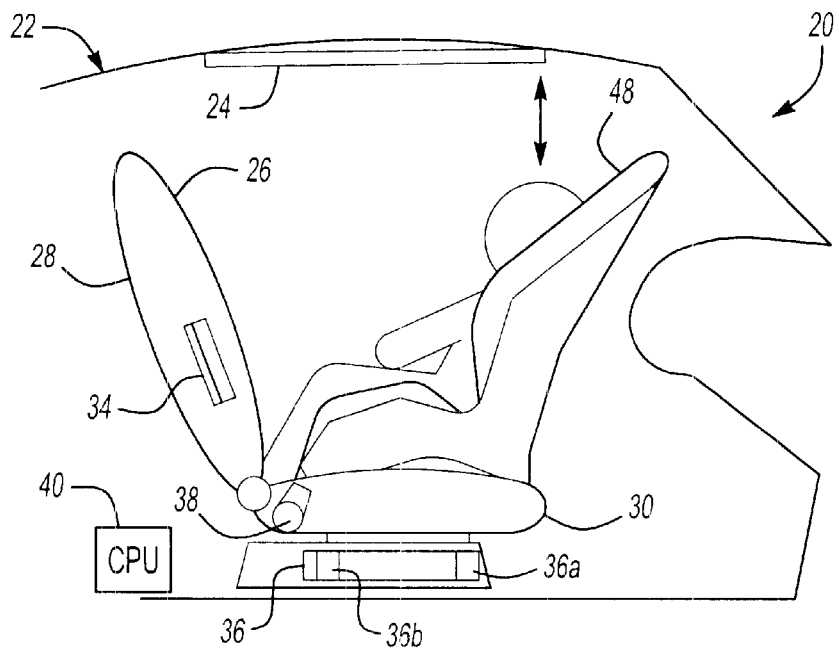
FIG. 6 illustrates the system of the present invention in use with an unbelted forward-facing infant seat but rotated 180 degrees.

FIG. 5 illustrates what is properly a rear facing infant seat 46 on vehicle seat 26, but rotated to be forward facing. In this case, it should be noted that the system 20 will proceed normally through the flow chart of FIG. 7 and still determine that the seat 46 is present. Similarly, FIG. 6 illustrates the forward facing infant seat 48 installed in a rearward facing position. The system 20 will proceed normally through the flow chart in FIG. 7 and still determine the presence of the infant seat 48. Thus, the detection of a child seat in the present invention does not depend upon the orientation of installation of the child seat, unlike prior systems.

Figure 8:
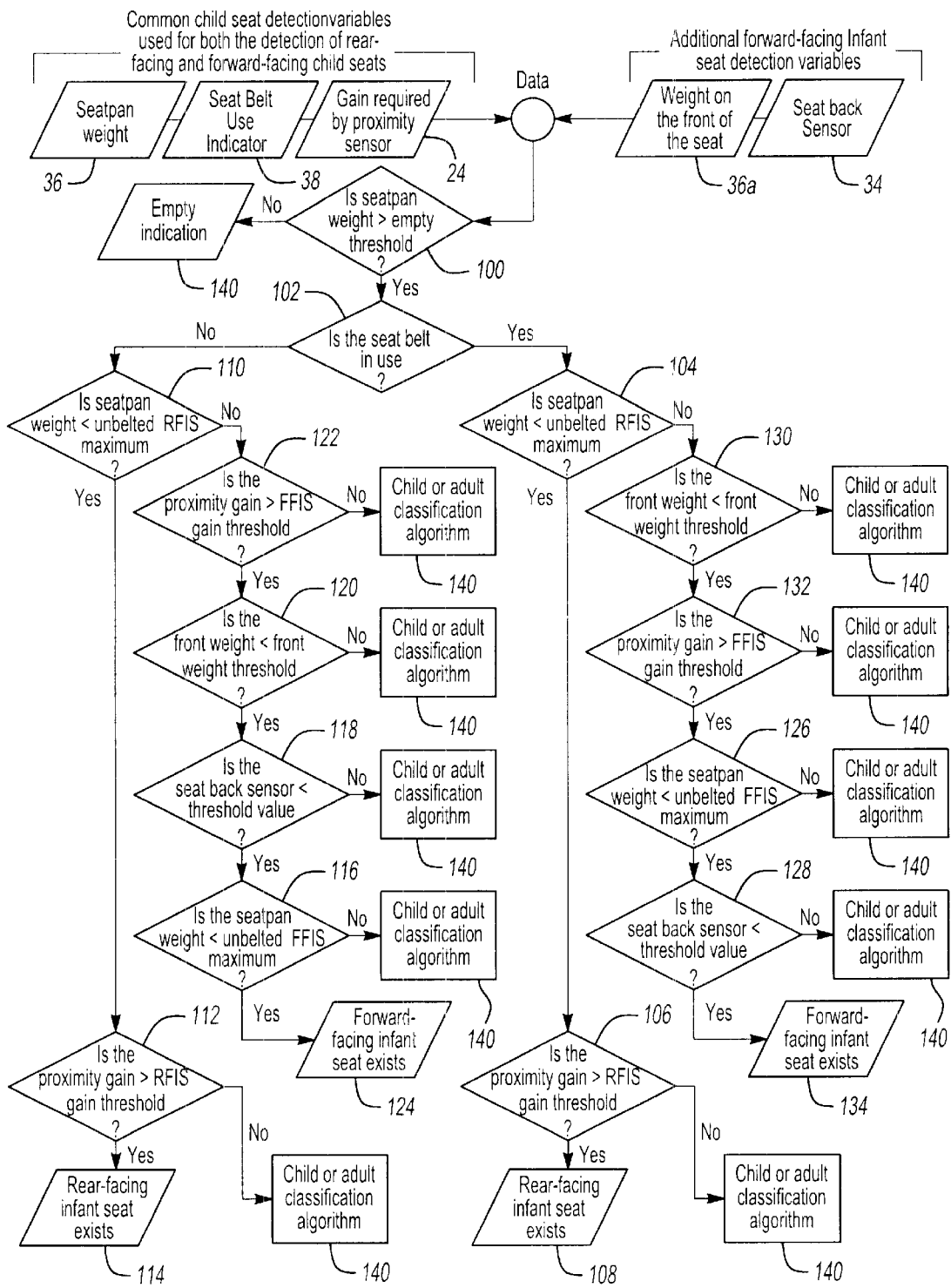
FIG. 8 is an alternate flowchart for the child seat detection algorithm.

FIG. 8 illustrates an alternate flow chart for operation of the present invention. It is similar to FIG. 7, but illustrates that many of the steps can be performed in an alternate order.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for detecting a child seat in a vehicle including the steps of:
 a) determining weight on a vehicle seat;
 b) comparing the weight on the vehicle seat to a rear-facing infant seat maximum;
 c) if the weight on the vehicle seat exceeds the rear-facing infant seat maximum, determining whether a forward-facing infant seat is on the seat;
 d) if the weight on the vehicle seat does not exceed the rear-facing infant seat maximum, determining whether a rear-facing infant seat is on the seat.

2. The method of claim 1 further including the steps of:

determining that the seat is empty if the weight on the vehicle seat does not exceed an empty threshold and performing said steps b)-d) only if the weight on the seat exceeds the empty threshold.

3. The method of claim 1 further including the steps of:

determining whether a seatbelt for the vehicle seat is in use and using a belted rear-facing infant seat maximum if the seatbelt is in use and using an unbelted rear-facing infant seat maximum if the seatbelt is not in use, the unbelted rear-facing infant seat maximum less than the belted rear-facing infant seat maximum.

4. The method of claim 1 further including the steps of:

determining a proximity gain of an occupant on the vehicle seat relative to a sensor in the vehicle headliner; and determining that an infant seat is present based upon the proximity gain.

5. The method of claim 1 further including the steps of:

measuring capacitance from a seat back sensor; and determining that an infant seat is present based upon the measured capacitance.

6. The method of claim 1 further including the steps of:

measuring weight on a front portion of the vehicle seat; and determining that an infant seat is present based upon the measured weight on the front portion.

7. A method for detecting a child seat in a vehicle including the steps of:

a) determining a seat weight on a vehicle seat;

b) determining a proximity gain of an occupant on the vehicle seat relative to a sensor in the vehicle headliner;

c) determining that the seat is empty if the seat weight does not exceed an empty threshold;

d) comparing the seat weight to a rear-facing infant seat maximum greater than the empty threshold;

e) if the seat weight exceeds the rear-facing infant seat maximum, determining whether a forward-facing infant seat is on the seat by comparing the seat weight to a forward-facing infant seat maximum and by comparing the proximity gain to a forward-facing infant seat proximity gain threshold; and f) if the seat is not empty and if the seat weight does not exceed the rear-facing infant seat maximum, determining whether a rear-facing infant seat is on the seat by comparing the proximity gain to a rear-facing infant seat gain threshold.

8. The method of claim 7 further including the steps of:

determining whether a seatbelt for the vehicle seat is in use, wherein the rear-facing infant seat maximum is a belted rear-facing infant seat maximum if the seatbelt is in use and an unbelted rear-facing infant seat maximum if the seatbelt is not in use, the unbelted rear-facing infant seat maximum less than the belted rear-facing infant seat maximum.

9. The method of claim 8 wherein the forward-facing infant seat maximum is a belted forward-facing infant seat maximum if the seatbelt is in use and an unbelted forward-facing infant seat maximum if the seatbelt is not in use, the unbelted forward-facing infant seat maximum less than the belted forward-facing infant seat maximum.

10. The method of claim 9 further including the steps of:

measuring capacitance from a seat back; and determining that a forward-facing infant seat is present only if the measured capacitance is less than a threshold value.

11. The method of claim 10 further including the steps of:

measuring weight on a front portion of the vehicle seat; and determining that a forward-facing infant seat is present only if the measured weight on the front portion is less than a front weight threshold.

12. A computer-readable medium storing a computer program which when executed by a computer performs the steps of:

a) determining that a vehicle seat is empty if a seat weight does not exceed an empty threshold;

b) comparing the seat weight to a rear-facing infant seat maximum greater than the empty threshold;

c) if the seat weight exceeds the rear-facing infant seat maximum, determining whether a forward-facing infant seat is on the seat by comparing the seat weight to a forward-facing infant seat maximum and by comparing a proximity gain relative to an overhead sensor to a forward-facing infant seat proximity gain threshold;

d) if the seat is not empty and if the seat weight does not exceed the rear-facing infant seat maximum, determining whether a rear-facing infant seat is on the seat by comparing the proximity gain to a rear-facing infant seat gain threshold.

13. A child seat detection system comprising:

a weight sensor for measuring seat weight on a vehicle seat; and a controller comparing the seat weight to a rear-facing infant seat maximum and determining whether a forward-facing infant seat is on the seat if the weight on the vehicle seat exceeds the rear-facing infant seat maximum, and determining whether a rear-facing infant seat is on the seat if the weight on the vehicle seat does not exceed the rear-facing infant seat maximum.

14. The child seat detection system of claim 13 further comprising:

a sensor determining a height of the occupant;

the controller determining that a rear-facing infant seat is present only if the height exceeds a rear-facing infant seat height threshold.

15. The child seat detection system of claim 14 wherein the controller determines that a forward-facing infant seat is present only if the height exceeds a forward-facing infant seat height threshold.

16. The child seat detection system of claim 15 further comprising: a capacitance sensor in a seat back; and the controller determining that a forward-facing infant seat is present only if the capacitance measured by the capacitance sensor is less than a threshold value.

17. The child seat detection system of claim 16 wherein the weight sensor includes a front weight sensor measuring a front weight on a front portion of the seat independent of a rear portion of the seat, the controller determining that a forward-facing infant seat is present only if the front weight is less than a front weight threshold.

* * * * *